United States Patent [19]

Verhoeve et al.

[11] Patent Number: 4,507,207

[45] Date of Patent: Mar. 26, 1985

[54] PROCESS FOR THE CHEMICAL REMOVAL OF PHOSPHORUS COMPOUNDS FROM WASTE WATER

[75] Inventors: Cornelis W. Verhoeve; Cornelis A. M Weterings, both of Stein, Netherlands

[73] Assignee: Stamicarbon B.V., Geleen, Netherlands

[21] Appl. No.: 623,226

[22] Filed: Jun. 21, 1984

Related U.S. Application Data

[63] Continuation of Ser. No. 510,682, Jul. 5, 1983, abandoned, which is a continuation of Ser. No. 293,328, Aug. 17, 1981, abandoned, which is a continuation of Ser. No. 162,448, Jun. 24, 1980, abandoned.

[30] Foreign Application Priority Data

Jun. 30, 1979 [NL] Netherlands .......................... 7905111

[51] Int. Cl.$^3$ ................................................ C02F 1/52
[52] U.S. Cl. .................................... 210/714; 210/709; 210/710; 210/724; 210/738; 71/34; 423/305; 423/319; 426/635; 426/807
[58] Field of Search .................... 71/34; 423/305, 319; 420/635, 807; 210/661, 663, 667, 702, 709, 712, 713, 714, 715, 724, 725, 738, 743

[56] References Cited

U.S. PATENT DOCUMENTS

| | | | |
|---|---|---|---|
| 3,523,889 | 8/1970 | Eis | 210/714 |
| 3,562,015 | 2/1971 | Lancy | 210/906 |
| 3,617,569 | 11/1971 | Daniels | 210/906 |
| 3,650,686 | 3/1972 | Hudson | 210/702 |
| 3,728,253 | 4/1973 | Kaufman | 210/906 |
| 3,733,265 | 5/1973 | Kraus | 210/906 |
| 3,827,984 | 8/1974 | Kawert | 210/702 |
| 3,965,002 | 6/1976 | Magnussun | 210/714 |
| 4,046,683 | 9/1977 | Tsunoda | 210/906 |
| 4,145,282 | 3/1979 | Bruckenstein | 210/714 |
| 4,167,479 | 9/1979 | Besik | 210/906 |

FOREIGN PATENT DOCUMENTS

| | | | |
|---|---|---|---|
| 50-88851 | 7/1975 | Japan | 210/906 |
| 50-152544 | 12/1975 | Japan | 210/906 |
| 539844 | 5/1973 | U.S.S.R. | 210/906 |

OTHER PUBLICATIONS

Hawley, The Condensed Chemical Dictionary Eighth Edition, 1971, 158,159,394.

*Primary Examiner*—Ernest G. Therkorn
*Attorney, Agent, or Firm*—Cushman, Darby & Cushman

[57] ABSTRACT

The invention relates to the chemical removal of phosphorus compounds from waste water, this waste water being treated with one or more metal compounds, without any problems presenting themselves as regards the separation of the metal phosphate compounds. To achieve this, the waste water is treated with the metal compound in a fluidized bed of metal phosphate particles.

The invention also relates to a process for the purification of waste water in which the effluent from a biological purification is subjected to the above-mentioned method for the removal of phosphorus.

16 Claims, No Drawings

PROCESS FOR THE CHEMICAL REMOVAL OF PHOSPHORUS COMPOUNDS FROM WASTE WATER

This is a continuation of application Ser. No. 510,682, filed July 5, 1983, which was a continuation of Ser. No. 293,328, filed Aug. 17, 1981, which was a continuation of Ser. No. 162,448, filed June 24, 1980 all now abandoned.

The invention relates to a process for the chemical removal of phosphorus compounds from waste water by treating the waste water containing phosphorus compounds with one or more metal compounds to form a water-insoluble metal phosphate compound.

As it is not very desirable for waste water containing dissolved phosphorus compounds to be discharged into surface water in connection with the eutrophication of the surface water occurring partly on account of this, various systems have been developed for removing dissolved phosphorus compounds from waste water.

These systems can be divided into two groups: those using chemical and those using biological removal.

As is known, the bacteria present in the activated sludge that is applied in the biological purification of waste water already remove some phosphate from the waste water, for a certain amount of phosphate is necessary for normal cell growth. This, however, is only a very small part of the total amount of phosphate to be removed.

Also known, however, are processes in which activated sludge under certain operating conditions assimilates a substantially larger amount of phosphorus than is required for normal cell growth (luxury uptake). By aeration the microorganisms are made to take up more phosphate than is required for their cell growth. After the sludge has settled, an effluent containing practically no phosphate is obtained. The sludge is then transported to an anaerobic tank (normal open tank without aeration); here the microorganisms consume the remaining part of the oxygen introduced by the aeration and give off the phosphate taken up additionally. Thus a phosphate-rich liquid is obtained, from which the phsophate can be precipitated chemically. The precipitate now is highly concentrated. This method can be applied already in the existing so-called second step (biological purification). A special form of biological dephosphatizing is obtained with the aid of autotrophic microorganisms that obtain their energy by oxidation of $Fe^{++}$ to $Fe^{+++}$ and assimilation of $CO_2$. This results in a very strong decrease of the phosphate content.

Dephosphatizing can also be effected by subjecting the waste water coming from the biological purification to the influence of sunlight and nitrogen in so-called lagoons, thus promoting the growth of algae. In a large number of countries, however, this method of dephosphatizing cannot be used in connection with the scarcity of sunlight and the winter conditions.

A disadvantage of the first two biological processes, however, is that either they are rather laborious, or they require very specific microorganisms.

The chemical methods virtually exclusively amount to the treatment of the waste water with iron, aluminium and/or calcium compounds, which is attended by the precipitation of water-insoluble phosphates. In this context, 'water-insoluble metal phosphate compounds' are understood to mean metal phosphate compounds the solubility product of which is smaller than approximately $10^{-5}$.

In the chemical method a distinction should be made between pre-precipitation, simultaneous-precipitation and post-precipitation. In the pre-precipitation not only the phosphate content but also the amounts of a number of impurities, such as organic and suspended matter, are reduced in the pre-purification step. In the pre-precipitation process care should be taken that the amount of phosphate remaining in the presettled waste water is large enough in relation to the rest of the organic matter to act as nutrient for the biological process. This is rather difficult. In the simultaneous-precipitation the phosphate is precipitated simultaneously with the biological purification. The sludge obtained after the purification has an increased $P_2O_5$ content. By phosphate precipitation in a separate third step of the water purification—called post-precipitation—the phosphate comes available as separate chemical sludge.

Pre-precipitation and simultaneous-precipitation present a problem in that the maximum efficiency of the phosphorus removal is about 90%, which in many cases is too low. When using post-precipitation, efficiencies of up to more than 99% can be reached.

Theoretically, therefore, post-precipitation would be an ideal method of removing phosphate. It has been found, however, that in this process gel formation occurs, so that the precipitate can hardly or not be separated off from the liquid. The addition of a carrier such as sand to promote the dewatering properties has no effect.

The object of the invention is to provide a process for the removal of phosphorus compounds from waste water in which this waste water is treated with one or more metal compounds, without any problems presenting themselves as regards the separation of the metal phosphate compounds.

According to the invention this object is reached by treating the waste water with the metal compounds in a fluidized bed of metal phosphate particles. By preference, the metal component of the metal compound and that of the metal phosphate, are the same.

Surprisingly, it has been found that in the process according to the invention the phosphate removal takes place rapidly and with a high efficiency, while the dewatering of the sludge presents no problems at all.

If this process is carried out in an upward flow reactor, a settling tank can often be done without, as the reactor effluent does not contain any solids.

In a preferred embodiment of the invention ground phosphate ore particles are used, for instance particles of a calcium phosphate ore such as apatite or calcium fluorophosphate.

The metal phosphate particles may consist entirely of amorphous and/or crystalline metal phosphate. It is, however, also possible to replace part of the metal phosphate by other compounds that are difficult to dissolve in water, such as various calcium carbonate modifications.

By preference the metal phosphate particles contain at least 50% by weight of metal phosphate. If a part is replaced by other materials, by preference a salt with the same metal component as the metal phosphate will be chosen.

The weight average particle size of the metal phosphate particles is generally chosen between 0.01 and 5 mm, more particularly between 0.05 and 0.5 mm. This particle size is important for the efficiency of the process in relation to the size of the equipment. The larger the particles, the larger the fluidized bed will have to be to obtain the same purification efficiency.

The liquid rate in the fluidized bed is determined mainly by the requirements that on the one hand the metal phosphate particles are to be fluidized and on the other hand the effluent must not entrain solids from the reactor.

As metal compounds especially iron, aluminum and/or calcium compounds are preferred. Examples of usual compounds are iron chloride, aluminum sulphate, calcium hydroxide (limemilk) and calcium sulphate (gypsum).

There is advantage in continuously or intermittently discharging part of the phosphate particles and using them as and/or processing them into phosphoric acid, technical-grade phosphate, cattle feed phosphate and/or phosphorus-containing fertilizer.

The residence time of the waste water in the fluidized bed must at least be so long that the reactions between the phosphorus and the metal compounds are complete or practically complete.

The solid material formed in this process may consist of various modifications of metal phosphate, the metal: P ratio varying in dependence of the H:P ratio or the OH:P ratio. Furthermore, an amount of crystal water may be present.

The process according to the invention is very suitable for application as the last (third) step in the conventional purification of domestic waste water, in which the phosphate removal is preceded by a biological purification.

According to a very suitable embodiment of the process according to the invention at least 1 mole of iron and/or aluminium compound (calculated as $Fe^{+++}$ of $Al^{+++}$) is supplied to the fluidized bed per mole of phosphate in the waste water supplied. By preference, a virtually stoichiometric amount or a small excess of iron and/or aluminium compound is supplied, for instance 1-2 moles of iron and/or aluminium compound per mole of phosphate in the waste water supplied. Further, the pH of the effluent from the fluidized bed is controlled at a value between 4 and 6. Thus, on the phosphate particles in the fluidized bed a precipitate is obtained that consists of practically pure iron and/or aluminium phosphate. With this embodiment a dephosphatizing efficiency of more than 99% can be reached.

According to another very suitable embodiment of the process according to the invention 4-25 moles, by preference 8-20 moles, of calcium compound (calculated as $Ca^{++}$) are supplied to the fluidized bed per mole of phosphate in the waste water supplied. By preference, a combination of gypsum and calcium hydroxide is used as calcium compound, which has as the advantage that the pH of the effluent can be controlled at a lower value than when only calcium hydroxide is used, while even a smaller amount of calcium ions is needed and, moreover, gypsum is even cheaper than calcium hydroxide. Further, the pH of the effluent is controlled at a value between 7 and 11, by preference between 7.5 and 9.5. Thus, a precipitate consisting of a mixture of calcium phosphate and calcium carbonate is obtained on the phosphate particles. With this embodiment a dephosphatizing efficiency of more than 99% can be reached.

According to a third very suitable embodiment of the process according to the invention at least 1.5 moles, by preference 2-8 moles, of calcium compound (calculated as $Ca^{++}$) are supplied to the fluidized bed per mole of phosphate in the waste water supplied. In doing so, use is made especially of the amount of calcium compound that the waste water contains by nature. A further amount of calcium compound is supplemented only if the waste water supplied contains by nature an insufficient amount of calcium compound to precipitate the phosphate in this waste water to a sufficient extent in the fluidized bed. Further, the pH of the effluent is controlled at virtually neutral value, for instance between 6 and 8 and by preference between 6.8 and 7.8. Thus, a precipitate consisting of practically pure calcium phosphate is obtained on the phosphate particles. With this embodiment a dephosphatizing efficiency of more than 95% can be reached.

If phosphate is to be removed from industrial waste water, e.g. the waste water from a phosphoric acid plant, a mixed fertilizer plant or a galvanizing works, it is in some cases possible to apply the process according to the invention as such, i.e. without a proceeding biological purification. If the phosphate is to be removed from waste water from a phosphoric acid and/or mixed fertilizer plant, it will be preferred to make use as much as possible of gypsum as metal compound, since this compound is there obtained in large quantities.

The invention will now be elucidated with the aid of the following examples, but is not limited thereto.

EXAMPLE I

Into a glass column with an internal diameter of 35 mm and a total length of 500 mm, 270 g of ground iron phosphate with a particle size between 0.08 and 0.35 mm was introduced.

This phosphate was brought into fluidization by supplying 10 l of waste water per hour to the bottom, which resulted in a bed height of approximately 390 mm.

The waste water treated was the effluent from a biological purification plant for domestic waste water, and contained on an average 10 mg/l of phosphorus compounds, expressed as P.

Simultaneously, an iron chloride solution was metered to the fluidized bed in such an amount that per hour 185 mg of $Fe^{+++}$ was supplied to the fluidized bed.

By acidifying the waste water in the fluidized bed the pH of the effluent was controlled at a value of 5.0.

A clear effluent with a phosphate content of 0.1 mg P/l was obtained. The phosphate removal efficiency obtained thus was 99%.

EXAMPLE II

Into a glass column with an internal diameter of 35 mm and a total length of 500 mm, 260 g of ground aluminium phosphate with a particle size betwen 0.12 and 0.25 mm was introduced.

This phosphate was brought into fluidization by supplying 10 l of waste water per hour to the bottom, which resulted in a bed height of approximately 410 mm.

This waste water was the effluent a biological purification plant for domestic waste water, and contained on an average 10 mg/l of phosphorus compounds, expressed as P.

Simultaneously, an aluminium sulphate solution was metered to the fluidized bed in such an amount that per hour 90 mg of $Al^{+++}$ was supplied to the fluidized bed.

By acidifying the waste water in the fluidized bed the pH of the effluent was controlled at a value of 5.3.

A clear effluent with a phosphate content of 0.1 mg P/l was obtained. The phosphate removal efficiency obtained thus was 99%.

EXAMPLE III-X

Into a glass column with an internal diameter of 35 mm and a total length of 500 mm, 250 g of ground calcium phosphate ore (Kouribga phosphate) with a particle size between 0.1 and 0.2 mm was introduced.

This ore was brought into fluidization by supplying 10 l of waste water per hour to the bottom, which resulted in a bed height of approximately 400 mm.

This waste water was the effluent from a biological purification plant for domestic waste water and contained on an average 10 mg/l of phosphorus compounds, expressed as P, and 50 mg/l of calcium compound, expressed as $Ca^{++}$.

In Example III-VII simultaneously lime and/or gypsum suspension was metered to the fluidized bed.

The various conditions and results are shown in the table. For each example the table successively indicates the amount of calcium hydroxide metered, the amount of gypsum metered, the total amount of calcium compound supplied to the fluidized bed (all three of which are expressed in g of $Ca^{++}$ per liter of waste water), the pH of the effluent from the column, the residual phosphate content and the phosphate removal efficiency.

| example | $Ca(OH)_2$ (g $Ca^{++}$/l) | $CaSO_4 \cdot 2H_2O$ (g $Ca^{++}$/l) | total of calcium compound supplied (g $Ca^{++}$/l) | pH | P (mg P/l) | efficiency |
|---|---|---|---|---|---|---|
| III | 0.03 | — | 0.08 | 8.3 | 0.5 | 95 |
| IV | 0.10 | — | 0.15 | 9.1 | 0.3 | 97 |
| V | 0.03 | 0.04 | 0.13 | 8.6 | 0.3 | 97 |
| VI | 0.13 | — | 0.18 | 10.1 | <0.1 | >99 |
| VII | 0.08 | 0.04 | 0.18 | 9.2 | <0.1 | >99 |
| VIII | — | — | 0.05 | 6.8 | 0.4 | 96 |
| XI | — | — | 0.05 | 7.1 | 0.2 | 98 |
| X | — | — | 0.05 | 7.7 | 0.1 | 99 |

What is claimed is:

1. A non-impeller driven fluidized bed process for chemically removing phosphate waste compounds from waste water containing the same consisting essentially in the combination of steps of:
   (a) forming in a reactor a fluidized bed of solid, water-insoluble finely divided metal phosphate particles with a non-impeller driven flow of waste water introduced thereinto at a rate sufficient to thereby maintain fluidization of said particles while insufficient to entrain and remove said particles from said reactor, and including a water-soluble metal compound in the waste water flow in the reactor, said metal compound being reactive with said phosphate waste compounds to form precipitated solid water-insoluble metal phosphate compounds, the amount of said metal compound being at least about stoichiometric with respect to the amount of said phosphate waste compound, in a said waste water flow;
   (b) treating said waste water by passing the same through said fluidized bed of finely-divided metal phosphate particles;
   (c) maintaining sufficient waste water residence time in said reactor and fluidized bed to effect essentially complete reaction between said phosphate waste compounds and said water-soluble metal compound, to form and precipitate said solid metal phosphate compound in the presence of said fluidized bed whereby a thus-formed precipitate collects on said solid fluidized particles; and
   (d) removing the thus-treated and dephosphatized waste water as effluent from said reactor, while avoiding entraining solids therewith.

2. Process according to claim 1, wherein said metal phosphate is ground phosphate ore.

3. Process according to claim 1, wherein said metal compounds and said metal phosphates have the same metal element in the metal component.

4. Process according to claim 3, wherein said metal phosphate particles have a weight average particle size between 0.1 and 5 mm.

5. Process according to claim 4, wherein said weight average particle size of said metal phosphate particles is between 0.05 and 0.5 mm.

6. Process according to claim 1, wherein said metal phosphate particles are continuously or intermittently discharged in part for processing into phosphorus-containing products including phosphoric acid, technical-grade phosphate, cattle feed phosphate and phosphorus-containing fertilizer.

7. Process according to claim 1, wherein said metal compounds consists of at least one or more compounds of iron, calcium or aluminum.

8. A process for chemically removing phosphorus compounds from waste water according to claim 7, wherein said metal compound consists of one or more compounds of iron, iron and aluminum, or aluminum such that at least one mole of the compounds selected, calculated on the basis of the iron ($Fe^{+++}$) and aluminum ($Al^{+++}$) content thereof per mole of the phosphate in the waste water, is supplied to said fluidized bed of metal phosphate particles at a pH maintained between a value of 4 and 6.

9. Process according to claim 7, wherein said metal compound consists of one or more calcium compounds such that 4 to 25 moles of said calcium compound (calculated as $Ca^{++}$) per mole of phosphate in the waste water are supplied to said fluidized bed of metal phosphate compounds at an effluent pH controlled at a value between 7 and 11.

10. Process according to claim 7, wherein said metal compound consists of one or more calcium compounds such that at least 1.5 moles of said calcium compound (calculated as $Ca^{++}$) per mole of phosphate in the waste water are supplied to the fluidized bed of metal phosphate particles at an effluent pH controlled at a value between 6 and 8.

11. A process for chemically removing phosphorus compounds from waste water according to claim 7, wherein said metal compound consists of one or more iron compounds, iron or aluminum compounds, or iron and aluminum compounds such that the molar ratio of said metal compound, calculated on the basis of the $Fe^{+++}$ and $Al^{+++}$ content thereof, to the phosphate in said waste water is 1 to 2 to 1 while the effluent pH is maintained between a value of 4 and 6.

12. Process according to claim 7, wherein 8 to 20 moles of said calcium compound (calculated as $Ca^{++}$) are supplied to the fluidized bed per mole of phosphate in the waste water supplied.

13. Process according to claim 7, wherein said effluent pH is controlled at a value between 7.5 and 9.5.

14. Process according to claim 7, wherein said calcium compound consists of a mixture of calcium hydroxide and calcium sulfate.

15. Process according to claim 7, wherein 2–8 moles of said calcium compound (calculated as $Ca^{++}$) are supplied to the fluidized bed per mole of phosphate in the waste water supplied.

16. Process according to claim 7, wherein said effluent pH is controlled at a value between 6.8 and 7.8.

* * * * *